(12) United States Patent
Sebire et al.

(10) Patent No.: US 11,388,364 B2
(45) Date of Patent: Jul. 12, 2022

(54) METHOD FOR AUTOMATIC TRIGGERING OF A DIRECT DELAYED MODE

(71) Applicant: SAGEMCOM BROADBAND SAS, Rueil Malmaison (FR)

(72) Inventors: Julien Sebire, Rueil Malmaison (FR); Laurent Herrmann, Rueil Malmaison (FR)

(73) Assignee: SAGEMCOM BROADBAND SAS, Rueil-Malmaison (FR)

( * ) Notice: Subject to any disclaimer, the term of this patent is extended or adjusted under 35 U.S.C. 154(b) by 0 days.

(21) Appl. No.: 16/326,565

(22) PCT Filed: Aug. 8, 2017

(86) PCT No.: PCT/EP2017/070012
§ 371 (c)(1),
(2) Date: Feb. 19, 2019

(87) PCT Pub. No.: WO2018/033425
PCT Pub. Date: Feb. 22, 2018

(65) Prior Publication Data
US 2019/0230315 A1    Jul. 25, 2019

(30) Foreign Application Priority Data
Aug. 19, 2016 (FR) ...................... 1657819

(51) Int. Cl.
*H04N 5/782* (2006.01)
*H04N 5/775* (2006.01)
(Continued)

(52) U.S. Cl.
CPC ............. *H04N 5/782* (2013.01); *H04N 5/775* (2013.01); *H04N 21/4325* (2013.01);
(Continued)

(58) Field of Classification Search
CPC .... H04N 5/782; H04N 5/775; H04N 21/4325; H04N 21/4334; H04N 21/44222; H04N 21/4532; H04N 21/454
(Continued)

(56) References Cited

U.S. PATENT DOCUMENTS

| | | |
|---|---|---|
| 2003/0046696 A1 | 3/2003 | Mizuno et al. |
| 2009/0142035 A1* | 6/2009 | Kummer ............ H04N 5/44543 386/296 |

(Continued)

FOREIGN PATENT DOCUMENTS

EP    2 618 562 A1    7/2013

OTHER PUBLICATIONS

International Search Report as issued in International Patent Application No. PCT/EP2017/070012, dated Oct. 11, 2017.

*Primary Examiner* — Thai Q Tran
*Assistant Examiner* — Nienru Yang
(74) *Attorney, Agent, or Firm* — Marshall, Gerstein & Borun LLP

(57) ABSTRACT

A method for the automatic triggering of a direct delayed mode by a decoder unit, includes reading, by a reading system of the decoder unit, into a favourites memory of the decoder unit, a favourite programmes recording list, a favourite programme recording including at least a start time and a broadcast channel identifier, filtering the favourite programmes recordings list according to a temporal criterion for selecting recordings which correspond to favourite programmes which commence less than a predetermined first period after a current date, for each selected recording, allocating direct delayed mode resources, these resources including at least one receiver and a delayed mode memory for triggering a direct delayed mode.

15 Claims, 1 Drawing Sheet

(51) Int. Cl.
  *H04N 21/433* (2011.01)
  *H04N 21/432* (2011.01)
  *H04N 21/442* (2011.01)
  *H04N 21/45* (2011.01)
  *H04N 21/454* (2011.01)

(52) U.S. Cl.
  CPC ... *H04N 21/4334* (2013.01); *H04N 21/44222* (2013.01); *H04N 21/454* (2013.01); *H04N 21/4532* (2013.01)

(58) Field of Classification Search
  USPC ........................................................ 386/291
  See application file for complete search history.

(56) References Cited

U.S. PATENT DOCUMENTS

| | | | | |
|---|---|---|---|---|
| 2011/0047577 | A1* | 2/2011 | Modi | H04N 5/782 |
| | | | | 725/47 |
| 2011/0206342 | A1* | 8/2011 | Thompson | H04N 5/782 |
| | | | | 386/200 |
| 2011/0305440 | A1* | 12/2011 | Plourde, Jr. | H04N 5/76 |
| | | | | 386/295 |
| 2014/0157307 | A1* | 6/2014 | Cox | H04N 21/4331 |
| | | | | 725/34 |
| 2016/0029085 | A1* | 1/2016 | Mountain | G06Q 10/1095 |
| | | | | 725/43 |

\* cited by examiner

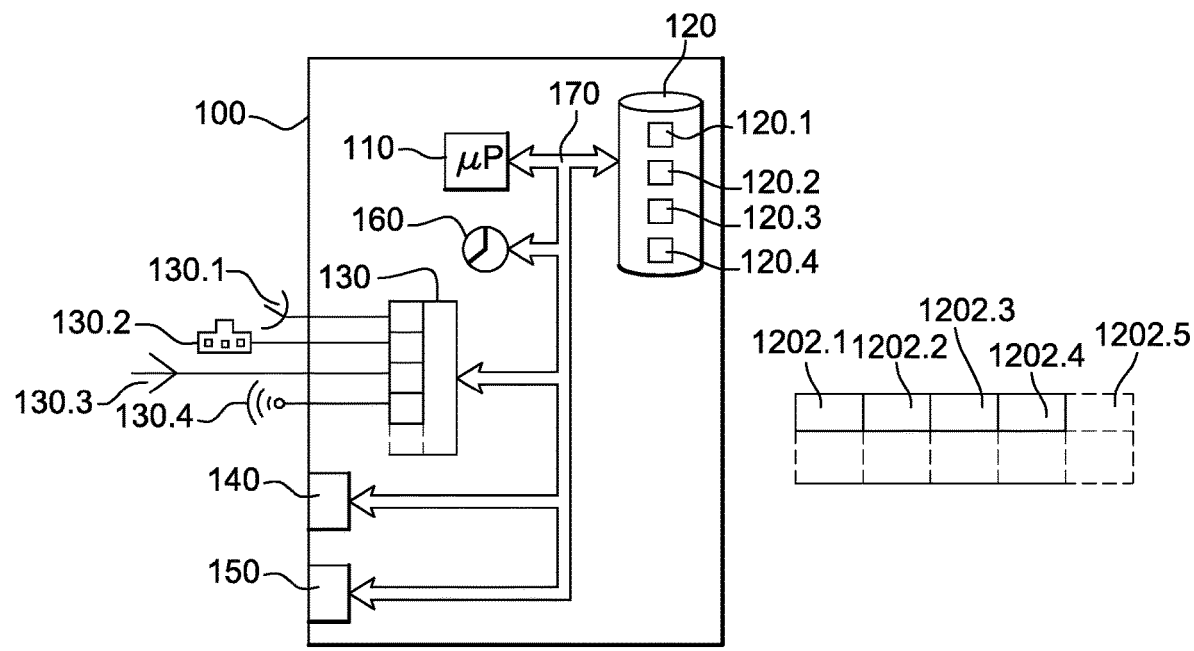
Fig. 1
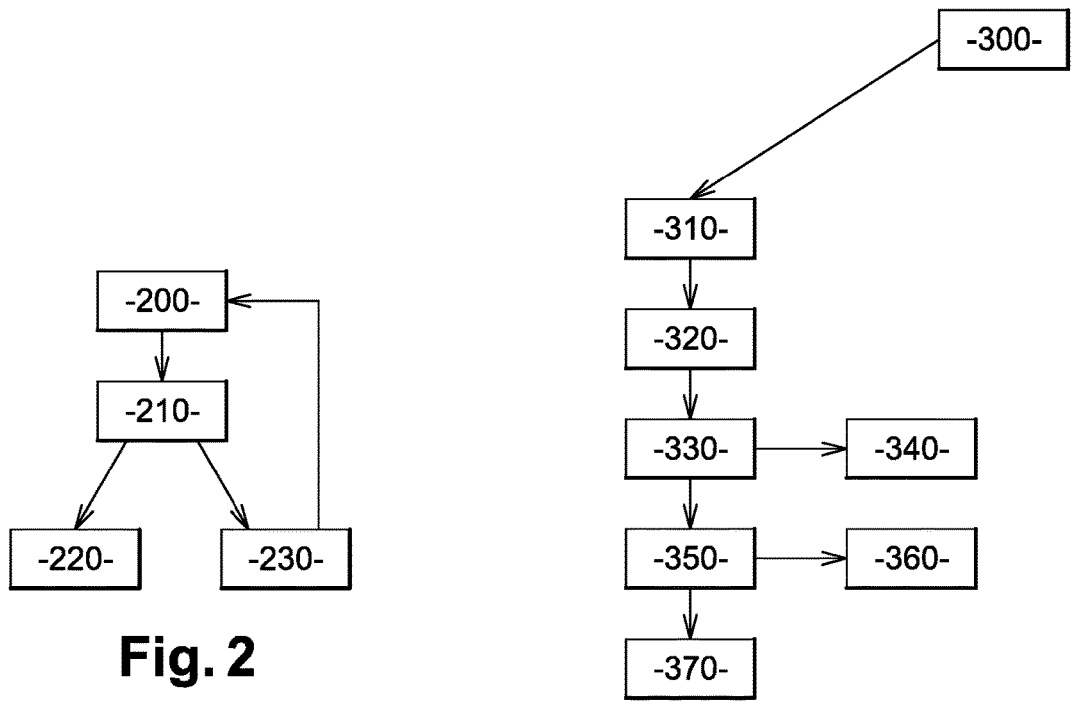
Fig. 2
Fig. 3

METHOD FOR AUTOMATIC TRIGGERING OF A DIRECT DELAYED MODE

CROSS REFERENCE TO RELATED APPLICATIONS

This application is the U.S. National Stage of PCT/EP2017/070012, filed Aug. 8, 2017, which in turn claims priority to French Patent Application No. 1657819 filed Aug. 19, 2016, the entire contents of all applications are incorporated herein by reference in their entireties.

FIELD OF THE INVENTION

The invention relates to a method for the automatic triggering of a direct delayed mode.

The field of the invention is that of television decoder units.

A decoder unit is also known as a "set-top box". A television decoder unit is a device that comprises at least:
- radio or cable communication means for receiving television broadcast signals,
- means for selecting a broadcast channel among the broadcast signals received, and
- means for producing signals able to be received by a television.

For the invention the signals are indiscriminately analogue or digital signals.

More specifically, the field of the invention is that of the management of a direct delayed mode by a television decoder unit.

The direct delayed mode is also known as "trick mode".

A direct delayed mode is a mode of viewing a programme broadcast directly (also known as a "live" programme), this mode enabling the broadcast to be paused and temporal browsing within the broadcast. Temporal browsing is taken to mean the capacity to scroll the programme in fast return or in fast forward.

It is understood that the fast forward cannot exceed the present date. In other words, the direct delayed mode does not make it possible to see what has not yet been broadcast.

PRIOR ART

In the prior art, in order to be able to watch, for certain, the whole of a televised programme, a user has several solutions at his disposal.

A first solution is known by the name of "catch up" or "replay" television. This first solution requires a specific and consequent network infrastructure to be put in place by the broadcaster. This catch up infrastructure must in particular enable:
- the recording of all the programmes that have to be caught up, and
- the service of all the catch up requests transmitted in an asynchronous manner by the users.

The decoder box must also necessarily be able to have available an active network connection to access in real time the catch up infrastructure. Often as a function of the technology employed (example: HLS (http live streaming)), the direct delayed function is not available via this first solution.

A second solution is to use the conventional recording functionalities of a decoder unit. With such a decoder unit it is possible to programme in advance the recording of a broadcast that it is wished to watch later. Such a programming is done via the electronic programming guide (EPG) or by selecting a channel then by manually launching the recording. This second solution has several drawbacks:
- The recordings are created on a hard disc and it will be necessary in one way or the other to delete them regularly to free disc space;
- From the user viewpoint, said user has to think about programming his recording before the start of his broadcast. This solution thus obliges the user to pay attention to something other than his present programme and to manage the advanced functions of the decoder unit.

DESCRIPTION OF THE INVENTION

The invention aims to overcome all or part of the drawbacks of the prior art identified above, and notably to propose means making it possible to improve the user experience.

In the invention a method is implemented for automatic triggering of a direct delayed mode on the programmes, or channels, the most watched by the user, that is to say his favourite programmes. These most watched programmes are determined on the basis of a history of use, which is equivalent to viewing habits.

Thanks to the method according to the invention, the user no longer loses the start of his favourite programmes if he is watching another programme at that time or if he is late to view a programme that he normally watches.

The mechanism of automatic launching of the direct delayed mode makes it possible to produce temporary recordings without any direct action by the user. This production takes place as a function of the available resources, in particular as a function of the reception capacities of the decoder unit.

The invention enables a user wishing to finish viewing a programme broadcast at the same time as a normal programme, to be able to watch the whole usual programme later, without any action by said user.

Thus:
- It is no longer necessary to have a decoder unit connected to a catch up infrastructure to be able to view the start of his usual broadcast;
- The user no longer has to think about creating a recording, the decoder does it automatically for him as a function of his habits. He no longer has to delete them either because the decoder manages this functionality in a temporary manner unlike a conventional recording on hard disc.

Thanks to this invention, the user experience is improved because the manual actions of the prior art, browsing in a catch up server or programming a recording, are no longer necessary.

To this end, one aspect of the invention relates to a method for the automatic triggering of a direct delayed mode by a decoder unit characterised in that the method comprises the following steps:
- Reading, by a reading means of the decoder unit, in a favourites memory of the decoder unit, a favourite programme recordings list, a favourite programme recording comprising at least a start time and a broadcast channel identifier,
- Filtering the favourite programme recordings list according to a temporal criterion to select recordings that correspond to favourite programmes which commence less than a predetermined first period after a current date, For each selected recording, allocating direct delayed mode resources, these resources comprising at least a receiver and a delayed mode memory for triggering a direct delayed mode.

Apart from the main characteristics that have been mentioned in the preceding paragraph, the method according to the invention may have one or more additional characteristics among the following, considered individually or according to all technically possible combinations thereof:

- the favourite programme recordings list is updated automatically as a function of the use made of the decoder unit, at least one action of the user causing an evaluation of a condition of updating the favourite programme recordings list;
- the at least one action is a change of channel action, such a change of channel causing the initialisation of a temporal zero, the updating condition being the overrun of a second predetermined period compared to the temporal zero;
- that a favourite programme recording comprises a date for classifying favourite programme recordings in the event of competition between them, a recording being added to the list with an initial predetermined grading;
- the grading increases each time that an evaluation of a condition of updating the favourite programme recordings list, linked to the recording by the time and the channel identifier, is evaluated as true;
- the favourite programme recordings list has a limited capacity, a recording being removed from the list when its grading reaches a predetermined minimum grading;
- the gradings decrease each time that an evaluation of a condition of updating the favourite programme recordings list, the condition being linked to the recordings by the time, is evaluated as true and when the maximum capacity of the list is reached;
- the maximum capacity of the list is equal to the number of broadcast channels that the decoder unit has the capacity to process simultaneously;
- during a placing in standby mode, the decoder unit plans (230) a wakening on a date substantially equal to the start time of the next preferred programme recording, the notion of next being evaluated relative to the date of placing in standby mode;
- that it comprises a step of permanent recording of a favourite programme according to whether the favourite programme recording corresponding to said favourite programme comprises a qualification flag of the recording to make of it a permanent recording instruction.

BRIEF DESCRIPTION OF THE FIGURES

Other characteristics and advantages of the invention will become clear from reading the description that follows, with reference to the appended figures, which illustrate:

FIG. 1, a schematic representation of the hardware means enabling the implementation of the method according to the invention;

FIG. 2, an illustration of the steps of the method according to the invention;

FIG. 3 illustrates an exemplary embodiment of the method according to the invention.

For greater clarity, identical or similar elements are marked by identical reference signs in all of the figures.

The invention will be better understood on reading the description that follows and by examining the figures that accompany it. These are presented for indicative purposes and in no way limit the invention.

DETAILED DESCRIPTION OF AN EMBODIMENT

FIG. 1 shows a decoder unit device 100. The decoder unit 100 comprises:
- a microprocessor 110. It is a processing means represented in a simplified manner. It is possible that a decoder unit comprises several microprocessors, with for example a microprocessor dedicated to image processing (mainly decompression);
- storage means 120, for example a hard disc, whether it is local or remote, whether it is simple or in a grid (for example RAID), or a memory chip;
- at least one communication interface 130 for the reception of televised programme broadcast signals. FIG. 1 shows:
  - a satellite interface 130.1,
  - an Ethernet interface 130.2,
  - a Hertzian interface 130.3 for digital terrestrial television,
  - a Wifi interface 130.4,
  - ... the list is not limiting;
- a control interface 140 for the reception of signals transmitted by a remote control handled by a user of the decoder unit to interact with the decoder unit;
- an audio-video output interface 150, for example in HDMI format, to connect the decoder unit to a television;
- a timer 160.

Each communication interface 130.X is associated with means enabling the decoder unit 100 to process several programmes simultaneously. For example, in the case of digital terrestrial television these means are tuners. In the case of an Ethernet or Wifi interface, these means are a pass band and processing capacities at the level of the processor or of a specialised processor.

FIG. 1 shows that the microprocessor 110 of the decoder unit, the storage means 120 of the decoder unit, the interfaces 130.X for the reception of televised programme broadcast signals, the control interface 140, the audio-video output interface 150 and the timer 160 are interconnected by a bus 170.

FIG. 1 shows that the storage means 120 comprise several zones. FIG. 1 shows that the storage means 120 comprise:
- a zone 120.1 comprising instructions codes for the implementation of the method according to the invention;
- a favourites memory zone 120.2. The favourites memory makes it possible to record a list of favourite programmes. Each favourite programme corresponds to a recording of a favourite programme. This thus results in a list of recordings. A favourite programme recording is, according to a chosen embodiment, a line in a table, a series of XML tags, etc.;
- a first predetermined period zone 120.3;
- a second predetermined period zone 120.4 corresponding to the period from which a programme is considered as interesting a user of the decoder unit. A typical value for this zone is 30 seconds.

For the alternative described in FIG. 1 shows that the favourites memory zone 120.2 comprises the following fields:
- a broadcast channel identifier field 1202.1. A broadcast channel is, for example, a television channel. A broadcast identifier thus enables the selection of an interface for receiving broadcast signals, it also enables the identification of data among the data received via the selected reception interface. These identified data correspond, for example, to the identified channel.

a start time field 1202.2. A start time is expressed in hours and minutes between 00 h 00 m and 23 h 59 m;

a grading field 1202.3, for example a positive integer;

a permanent recording flag field 1202.4. It is typically a Boolean value.

When an action is ascribed to a device it is in fact carried out by a microprocessor of the device controlled by instruction codes recorded in a memory of the device. Although an action is ascribed to an application, it is in fact carried out by a microprocessor of the device in a memory of which the instruction codes corresponding to the application are recorded. When a device, or an application transmits or receives a message, said message is transmitted or received via a communication interface of said device or of said application.

FIG. 2 shows a preliminary step 200 in which the decoder unit 100 reads the content of the favourites memory zone 120.2.

The preliminary step 200 is followed by a step 210 of filtering the list read, as a function of a temporal criterion. The temporal criterion is of the type:

(current time−start time)<first predetermined period

The current time is obtained by interrogating the timer 160. The first predetermined period is a parameter that is obtained by reading the first predetermined period zone 120.3 of the storage means.

It is accepted that the start time must also be later than the current time. The temporal criterion thus makes it possible to select the recordings of favourite programmes that are beginning soon.

A conventional order of magnitude for the first predetermined period is 10 seconds to several minutes according to the margin that it is wished to take relative to the precision of a programme grid. It is thereby possible to manage programmes which could begin earlier than the anticipated time, a timer drift, or non-synchronous timers.

At the end of the filtering step 210 the decoder unit 100 has thus established a list of recordings of favourite programmes which describe programmes that are going to start soon. This list may be empty.

If the list is empty, the decoder unit 100 passes from step 210 to a planning step 230 in which the decoder unit places the process of taking in charge favourites on standby. This comes down to planning the next running, or wakening, of the process.

If the unit was active at the moment of the start-up of the process, then the next running date depends on the first predetermined period:

next running date=current date+first predetermined period.

It is possible to reduce this date by several seconds in order to take into account scheduling drifts.

If the unit was on standby at the moment of the start-up of the process, then the next running date depends on the list of favourites. Before returning to standby, the unit is going to programme a wakening date which will be the start time of the favourite programme the closest to the current date.

On its wakening, or on its next running date, the decoder unit implements the preliminary step 200.

In a simple alternative, the preliminary step 200 is implemented at a predetermined period, for example every minute.

If the favourite programme recordings list is not empty, the decoder unit 100 passes from step 210 to a step 220 of processing favourite programmes 30.

In the processing step 220 for each favourite programme recording obtained at the preceding step, the decoder unit tries to implement a direct delayed mode.

In an alternative, the favourite programme recordings list is classified by decreasing grading.

By construction a decoder unit has a given capacity for processing broadcast channels simultaneously. For example, if a decoder unit comprises two tuners, then its Hertzian channel processing capacity is doubled. For network broadcasting channels, for example by Internet, the capacity depends on the pass band of the network and the processing capacity of the microprocessor. A conventional simultaneous processing capacity is comprised between 8 and 16. This is known as reception capacity or number of receivers. A receiver is also called a Front End: which forms the interface with the broadcast signals.

The processing of a favourite programme recording comprises at least:

the selection of an interface for receiving a broadcast and extraction and its configuration to obtain data corresponding to the identifier of the favourite programme recording programme, it is known as a receiver;

the recording in a temporary memory of the data received. The memory is temporary because it is a direct delayed mode which uses a circular memory.

The processing of a favourite programme recording thus allocates a turning memory and a receiver to a favourite programme recording. It is an automatic implementation of a direct delayed mode.

If there is sufficient resource, in particular receiver resource, all the recordings of the list are processed. Otherwise the processing stops from the moment that there is no more available resource.

It may be noted that the direct delayed mode stops at the end of the identified programme. The decoder unit automatically obtains the period of the programme by interrogation of the electronic programming guide, also called EPG.

The method according to the invention may be described by the following pseudo algorithm:

As long as PpList is not empty
  If Pp(i) (start time) is reached
    If resource available
      Launch the direct delayed mode of Pp(i)
    Otherwise
      For all the direct delayed modes of Pp(j) underway
        If Pp(j)(grading)<Pp(i)(grading)
        Stop Pp(j) direct delayed mode
        Launch Pp(i) direct delayed mode
      End for
  If Pp(i)(hour_end) is reached
    Stop Pp(i) direct delayed mode In this notation one has:
PpList: the favourite programme recordings list,
Pp(i): the nth element of PpList This pseudo algorithm illustrates a mode for managing recordings in which the taking into account of recordings as a function of their grading is prioritised.

With this method, when a user changes channel and arrives on a programme having an automatic direct delayed mode underway, it could be proposed to him to view the programme from the start by the interface. This behaviour may obviously be configured in the user preferences. Or he can move about in the temporary recording himself using the fast displacement buttons of a remote control of the decoder unit.

FIG. 3 shows a step 300 of monitoring, by the decoder unit, of the actions of a user of the decoder unit. The decoder unit permanently monitors the actions of a user from the moment of its start-up. When the user changes channel the algorithm, the method according to the invention, intercepts this action and activates a process of updating the favourite programmes memory. If the action of the user is a change of channel action, then the decoder unit passes to a step 310 of triggering a tern porisation.

In step 310, the decoder unit initialises a temporal zero, for example by placing a counter at zero or by assigning the current date to a specific variable. Then it places itself in standby mode.

If the counter overruns the second predetermined value then the decoder unit passes to a step 320 of obtaining the characteristics of the current programme, that is to say the programme selected by the user. This comes down to evaluating a condition of updating the favourite programmes memory. This condition is, in our example: "the user passes at least one second period consecutively in front of the programme".

When the minimum time is reached, the decoder unit checks if the programme may be added to the programmes list or if, for lack of space in the available resources of the decoder unit, it begins a voting mechanism within the list of favourite programmes already in the memory.

In step 320 the decoder unit interrogates the electronic programme guide to obtain at least the start time of the current programme. With this information, the decoder unit searches, in a step 330, in the favourite programmes memory to determine if the current programme is already found therein.

This search comes down to posing the question: does a recording exist designating the current channel (reading of the programme identifier) and of which the start time is comprised in the interval formed by [start time of the current programme, start time of the current programme+period of the current programme].

If the current programme already exists in the favourite programmes memory then the decoder unit passes to a step 340 of increasing the grading in the favourite programmes recording. In one embodiment, this grading increase comes down to increasing the grading by 1.

In an alternative of the invention a maximum grading exists. This maximum grading is a parameterisation. In this alternative, the grading of a favourite programme recording, that is to say the grading associated with a favourite programme, cannot exceed this maximum value.

If the current programme does not exist in the favourite programmes memory, then the decoder unit passes to a step 350 of determining the space remaining in the favourite programmes memory. To respond to this question the decoder unit searches in the favourite programmes memory all the recordings of which the start time is comprised within the interval [start time of the current programme, start time of the current programme+period of the current programme]. If the number of recording found is lower than the reception capacity of the unit then space remains, otherwise no space remains.

If space remains, then the decoder unit passes to a step 360 of insertion of a new recording in the favourite programmes memory. This new recording is initialised with:

The identifier of the current programme, for example the channel number;

The start time of the current programme;

An initial grading. In a preferred alternative, the initial grading is equal to 1.

If there is no longer any space, then the decoder unit passes to a step 370 of decreasing the gradings. For each recording of the favourite programmes memory of which the start time is comprised within the interval [start time of the current programme, start time of the current programme+period of the current programme] the decoder unit decreases the grading by 1. If, in the course of running through the recordings, a grading becomes less than a minimum grading, then this recording is deleted.

If a recording is deleted, this frees space for a new recording which is then inserted as at the step of inserting a new recording.

In a preferred alternative, the minimum grading is 1.

In an alternative of the invention, the recordings are classified by increasing age, which makes it possible to conserve as a priority the oldest recordings.

In this alternative, a favourite programme recording comprises a creation date field 1202.5 to enable the classification.

With the invention, a user no longer has to think about launching himself a direct delayed mode on a favourite programme or programming a recording. The decoder unit does it automatically as a function of his habits via the determination of favourite programmes. Thus, from the moment that a favourite programme is broadcast, it is placed in direct delayed memory and made available for later delayed viewing, independently of the current programme.

If the number of receivers is sufficient and if the storage capacity allows it, several delayed directs may be launched simultaneously on different favourite programmes themselves broadcast simultaneously or having temporal overlap periods. As a function of the number N of receivers available in the decoder and K recordings already programmed: N-K-1 simultaneous delayed directs of favourite programmes may be launched at the most; 1 receiver being reserved for the current programme.

With the invention the start of a favourite programme can be viewed in direct delayed mode, that is to say that the user has access to the programme in delayed mode from the start to the end thereof, even if he has not watched it from the start.

If the decoder unit has a permanent storage zone (hard disc type), it is also possible, in an alternative, to propose an option of conserving/archiving the "favourite programme". This option is materialised by a flag field at the level of a favourite programme recording. If the field stores a "true" value, then the programme is recorded for later viewing, that is to say not a viewing in direct delayed mode. In this case the favourite programme is transferred from the direct delayed memory to a permanent storage zone of the disc of the decoder unit. The value of the field flag is supplied by an appropriate human machine interface.

The invention claimed is:

1. A method for the automatic triggering of a direct delayed mode by a decoder unit, comprising:
   reading, by a reading system of the decoder unit, in a favourites memory of the decoder unit, a favourite programme recordings list, a favourite programme recording comprising at least a start time and a broadcast channel identifier, said reading being triggered automatically by the decoder unit and without receiving an external command by the decoder unit, the favourite programme recording lists stored in the favourites memory including most watched programmes by a user of the decoder unit and being generated by the decoder unit as a function of the use made of the decoder unit, filtering the favourite programme recordings list according to a temporal criterion to select recordings that correspond to favourite programmes which commence less than a predetermined first period after a current date, said filtering being triggered automatically by the decoder unit and without receiving an external command by the decoder unit, for each selected recording, allocating direct delayed mode resources, the resources comprising at least a receiver and a delayed mode memory for triggering a direct delayed mode to said selected recording, wherein said filtering includes establishing a list of the selected recordings that correspond to favourite programmes which commence less than the predetermined first period after the current date, and wherein the method further comprises if the list of the selected recordings is empty and the decoder unit is not on standby mode at a time of said reading, then, the decoder unit automatically carries out said reading and said filtering again at a next running date that corresponds to a sum of the current date and a predetermined period of time, if the list of the selected recordings is empty and the decoder is on standby mode at a time of said reading, then, the decoder unit programs a wakening date at which the decoder unit automatically carries out said reading and said filtering again, and if the list of the selected recordings is not empty, the decoder unit carries out said allocating.

2. The method for the automatic triggering of a direct delayed mode according to claim 1, wherein the favourite programme recordings list is updated automatically as a function of the use made of the decoder unit, at least one action of the user causing an evaluation of a condition of updating the favourite programme recordings list.

3. The method for the automatic triggering of a direct delayed mode according to claim 2, wherein the at least one action of the user is a change of channel, such a change of channel causing the initialisation of a temporal zero, the updating condition being the overrun of a second predetermined period compared to the temporal zero.

4. The method for the automatic triggering of a direct delayed mode according to claim 1, wherein a favourite programme recording comprises a grading for classifying favourite programme recordings in the event of competition between them, a recording being added to the list with a predetermined initial grading.

5. The method for the automatic triggering of a direct delayed mode according to claim 4, wherein the grading increases each time that an evaluation of a condition of updating the favourite programme recordings list, linked to the recording by the time and the channel identifier, is evaluated as true.

6. The method for the automatic triggering of a direct delayed mode according to claim 4, wherein the favourite programme recordings list has a limited capacity, a recording being removed from the list when its grading reaches a predetermined minimum grading.

7. The method for the automatic triggering of a direct delayed mode according to claim 6, wherein the maximum capacity of the list is equal to the number of broadcast channels that the decoder unit has the capacity of processing simultaneously.

8. The method for the automatic triggering of a direct delayed mode according to claim 4, wherein the gradings decrease each time that an evaluation of a condition of updating the favourite programme recordings list, the condition being linked to the recordings by the time, is evaluated as true and when the maximum capacity of the list is reached.

9. The method for the automatic triggering of a direct delayed mode according to claim 1, wherein, the wakening is a date substantially equal to the start time of the next preferred programme recording, the notion of next being evaluated relative to the date of placing in standby mode.

10. The method for the automatic triggering of a direct delayed mode according to claim 1, further comprising a step of permanent recording of a favourite programme according to whether the favourite programme recording corresponding to said favourite programme comprises a qualification flag of the recording to make of it a permanent recording instruction.

11. A non-transitory memory device comprising instruction codes for the implementation of the method according to claim 1.

12. A decoder device implementing a method of automatic triggering of a direct delayed mode according to claim 1.

13. A non-transitory memory device comprising a programme product including instructions which, when the programme is run by a device, lead said device to implement the steps of the method according to claim 1.

14. The method for the automatic triggering of a direct delayed mode according to claim 1, wherein the allocating of direct delayed mode resources includes storing data associated with the selected recording in the delayed mode memory, said delayed mode memory being a temporary memory.

15. The method for the automatic triggering of a direct delayed mode according to claim 14, wherein the temporary memory is a circular memory.

* * * * *